United States Patent [19]

Uzuda et al.

[11] Patent Number: 4,956,703
[45] Date of Patent: Sep. 11, 1990

[54] PRINT SIMULATION APPARATUS FOR ADJUSTING THE COLOR SEPARATION CONDITIONS OF A COLOR SCANNER

[75] Inventors: Tetsuji Uzuda, Kawagoe; Takashi Kuramoto, Oomiya; Takeo Onga, Saitama; Teruo Suzuki, Kamifukuoka; Takeshi Suwa, Tokyo, all of Japan

[73] Assignee: Toppan Printing Co., Ltd., Tokyo, Japan

[21] Appl. No.: 243,633

[22] Filed: Sep. 13, 1988

[30] Foreign Application Priority Data

Sep. 14, 1987 [JP] Japan .................. 62-230044
Nov. 17, 1987 [JP] Japan .................. 62-289761
Nov. 17, 1987 [JP] Japan .................. 62-289762
Nov. 17, 1987 [JP] Japan .................. 62-289763

[51] Int. Cl.⁵ ........................................ H04N 1/46
[52] U.S. Cl. .......................... 358/76; 358/75; 358/78
[58] Field of Search ............... 358/76, 78, 80, 75

[56] References Cited

U.S. PATENT DOCUMENTS

| | | | |
|---|---|---|---|
| 4,598,282 | 7/1986 | Pugsley | 358/76 X |
| 4,639,770 | 1/1987 | Jung et al. | 358/76 |
| 4,684,978 | 8/1987 | Yamada | 358/76 X |
| 4,691,229 | 9/1987 | Colditz et al. | 358/76 |
| 4,769,696 | 9/1988 | Utsuda et al. | 358/80 |
| 4,825,296 | 4/1989 | Wagonsonner et al. | 358/80 X |
| 4,847,689 | 7/1989 | Yamamoto et al. | 358/75 X |

Primary Examiner—James J. Groody
Assistant Examiner—Mark R. Powell
Attorney, Agent, or Firm—Bacon & Thomas

[57] ABSTRACT

A color original is picked up by a pickup head and B, G, and R image signals are obtained and supplied to a color process circuit including masking correction, undercolor removal, and gradation correction circuits. Y, M, C, and K image signals output from the color process circuit are supplied to an exposure head to form a color separation plate. A print simulation unit having first and second frame memories is connected in parallel with the color process circuit. The B, G, and R signals are also written into the first frame memory. The signal read out from the first frame memory is supplied to the color process circuit and is color-corrected. The output from the color process circuit is written into the second frame memory and output to a color monitor. The second frame memory stores two frames, and can display both frames on the color monitor for comparison. The second frame memory has a data latch for latching a predetermined pixel signal, and a circuit for synthesizing the latched data in place of a predetermined pixel signal of the image signals. The second frame memory further has a comparator for detecting a pixel of the image signals having a level higher than a highlight set level, and a circuit for flashing the pixel having a level higher than the highlight set level.

7 Claims, 6 Drawing Sheets

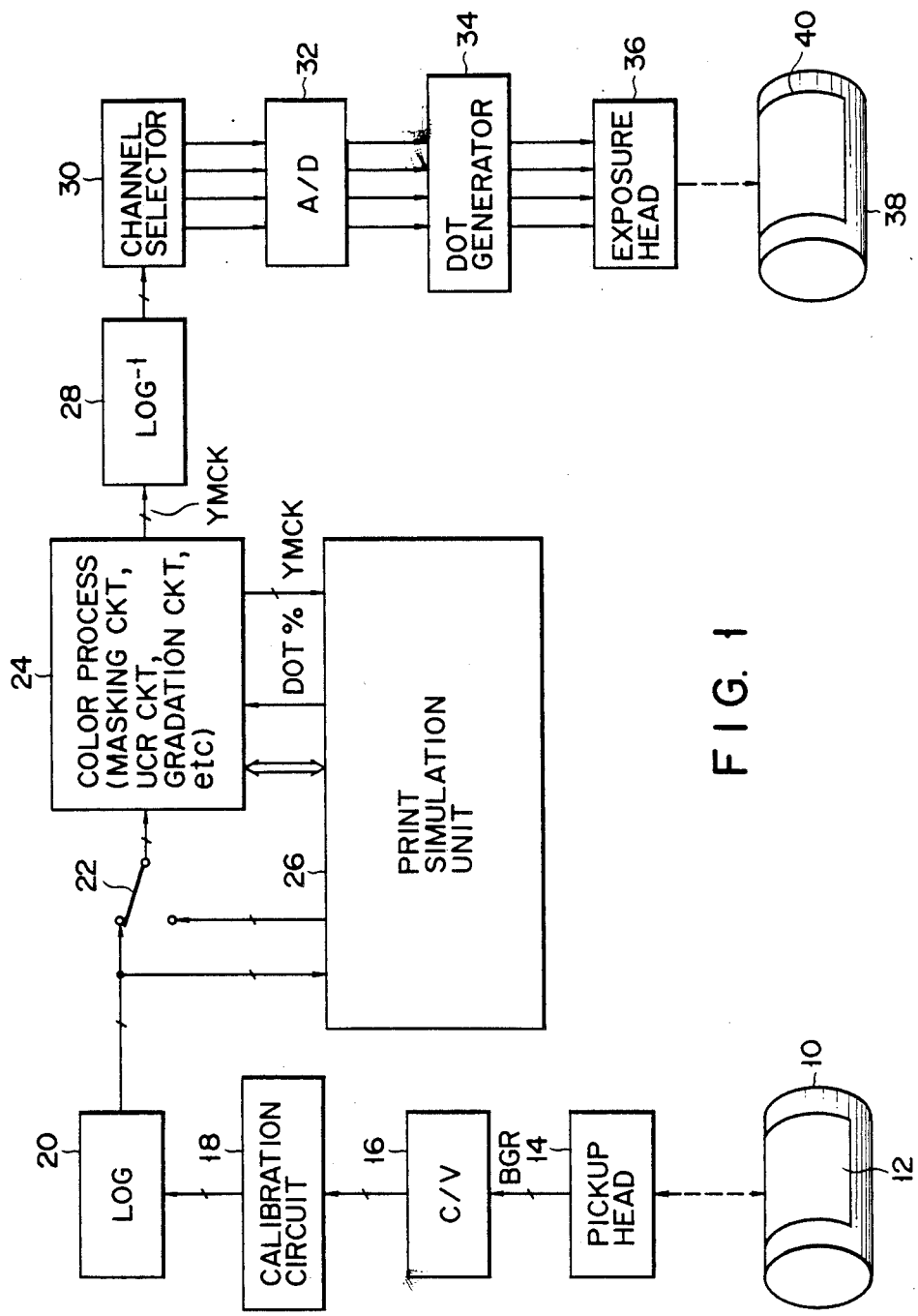
F I G. 1

PRINT SIMULATION APPARATUS FOR ADJUSTING THE COLOR SEPARATION CONDITIONS OF A COLOR SCANNER

BACKGROUND OF THE INVENTION

1. Field of the Invention

The present invention relates to a print simulation apparatus for simulating a color printed image on a screen of a color monitor in order to adjust and check color separation conditions (various color correction amounts) when a color original is printed in color and, more particularly, to a print simulation apparatus which is used in combination with a conventional color scanner and is convenient for proofing.

2. Description of the Related Art

When a color print is made, a color original is scanned by a color scanner, and various color corrections are made on the picked-up image signal. Thereafter, the corrected image signal is color-separated, and color separation plates are formed in accordance with color separation signals. A proof plate is formed by combining the obtained color separation plates, characters, and a plane mesh in accordance with a layout, and is set in a proof press to perform proofing. The color separation conditions (various color correction amounts) are checked based on color tone of the obtained proof. If the color tone of the proof is not achieved, the color correction amounts are changed and color separation is performed again. Thereafter, formation of color separation plates and proofing are performed again. When a proof having preferable color tone is obtained, a press plate is formed based on the corresponding color separation plates, and is set in a printing press.

Such proofing requires much time, cost and labor. Therefore, in recent years, various print simulation apparatus using color monitors have been developed. With these apparatus, the finished state of a print can be simulated on a color monitor and color separation conditions can be checked without proofing.

A conventional print simulation apparatus comprises a memory for temporarily storing an image signal derived from a color scanner, and a color correction circuit, having the same arrangement as that arranged in the color scanner, for color-correcting a signal read out from the memory. The output from the color correction circuit is supplied to the color monitor, and the finished state of a print is simulated on the color monitor. Thus, color separation conditions can be electronically checked, and the color correction circuit of the print simulation apparatus is adjusted, so that preferable color correction amounts, i.e., color separation conditions can be determined.

However, in a print simulation apparatus of this type, during simulation for determining changing color separation conditions, not an operation section (dials, knobs, and the like) of a color correction apparatus of the color scanner, but the operation section of the color correction circuit of the print simulation apparatus, is adjusted. For this reason, when color separation plates are formed after simulation, parameters of the operation section must be set again according to that of the color correction circuit of the color scanner, resulting in cumbersome operation for an operator. If the operation section is of analog type, identical values cannot often be precisely set.

Moreover, in the conventional simulation apparatus, a simulated image of one color original is merely displayed on a monitor screen, and an overall comparison with a simulated image of another color original or a partial comparison of identical color tone portions of another color original cannot be performed. For this reason, when a plurality of color originals are printed in one print, the overall color tone and gradation cannot be matched. As a result, the color tone and gradation of a print as a whole cannot be matched.

Finally, in the conventional print simulation apparatus, a print simulated image is merely displayed on a color monitor. Thus, a setting value or location of a highlight set level associated with white balance cannot be specified.

SUMMARY OF THE INVENTION

The present invention has been made in consideration of the above situation, and has as its first object to provide a print simulation apparatus which can precisely set optimal color separation conditions of a color scanner with a simple arrangement.

It is a second object of the present invention to provide a print simulation apparatus which can compare printed images of a plurality of color originals and can match color tone and gradation.

It is a third object of the present invention to provide a print simulation apparatus which can compare corresponding (identical) portions of printed images of a plurality of color originals and can match color tone and gradation.

It is a fourth object of the present invention to provide a print simulation apparatus which can check highlight setting when a printed image is simulated on a monitor.

In order to achieve the first object of the present invention, there is provided a print simulation apparatus comprising a first frame memory for storing an image signal which is not color-corrected and supplying the stored signal to a color process circuit of the color scanner, a second frame memory for storing a color-corrected image signal output from the color process circuit, and a color monitor for displaying the image signal stored in the second frame memory.

In order to achieve the second object of the present invention, there is provided a print simulation apparatus comprising first and second frame memories for storing image signals for two frames of the color-corrected image signal, a mixing circuit for combining portions of image signals for respective frames read out from the first and second frame memories so as to generate an image signal for one frame, and a color monitor for displaying an output signal from the mixing circuit.

In order to achieve the third object of the present invention, there is provided a print simulation apparatus comprising a data latch circuit for storing an image signal corresponding to a predetermined pixel of a color-corrected image signal of a predetermined frame and a mixing circuit for, when a color-corrected image signal of another frame is displayed, using a stored signal of the data latch circuit in place of the image signal of the predetermined pixel.

In order to achieve the fourth object of the present invention, there is provided a print simulation apparatus comprising a monitor for displaying a color-corrected image signal, a comparator for detecting that a level of the color-corrected image signal of each pixel is higher than a predetermined highlight set level, and a selector for causing a pixel having a level higher than the highlight set level to flash in accordance with an output from the comparator.

According to the first print simulation apparatus of the present invention, an original is scanned by the color scanner, and an image signal before being subjected to color correction is temporarily written in the first frame memory. A signal read out from the first memory is supplied to a color correction circuit of the color scanner. The output signal from the color correction circuit is written in the second frame memory. A correction amount of the color correction circuit of the color scanner is adjusted to determine color separation conditions and to set the color separation conditions in the color correction circuit while simulating a printed image on a screen of the color monitor based on a signal read out from the second frame memory. Therefore, it is not necessary again set the color separation conditions after simulation.

According to the second print simulation apparatus of the present invention, an image signal is generated by combining portions of two simulated images and is displayed. Thus, two simulated images can be compared, and the overall color tone and gradation of the two images can be matched.

According to the third print simulation apparatus of the present invention, when a print simulated image is displayed on a monitor, a predetermined area is displayed in color tone of not a simulated image but of the stored image as a reference, so that color tone of areas of a plurality of color originals which should have identical color tone can be precisely matched.

According to the fourth print simulation apparatus of the present invention, in a simulated image, a pixel having a dot% higher than a highlight set level is flashed. Therefore, it can be checked if highlight setting is correctly performed.

BRIEF DESCRIPTION OF THE DRAWINGS

FIG. 1 is block diagram showing an overall arrangement of a print simulation apparatus according to an embodiment of the present invention;

DETAILED DESCRIPTION OF THE PREFERRED EMBODIMENT

Figure 2A:
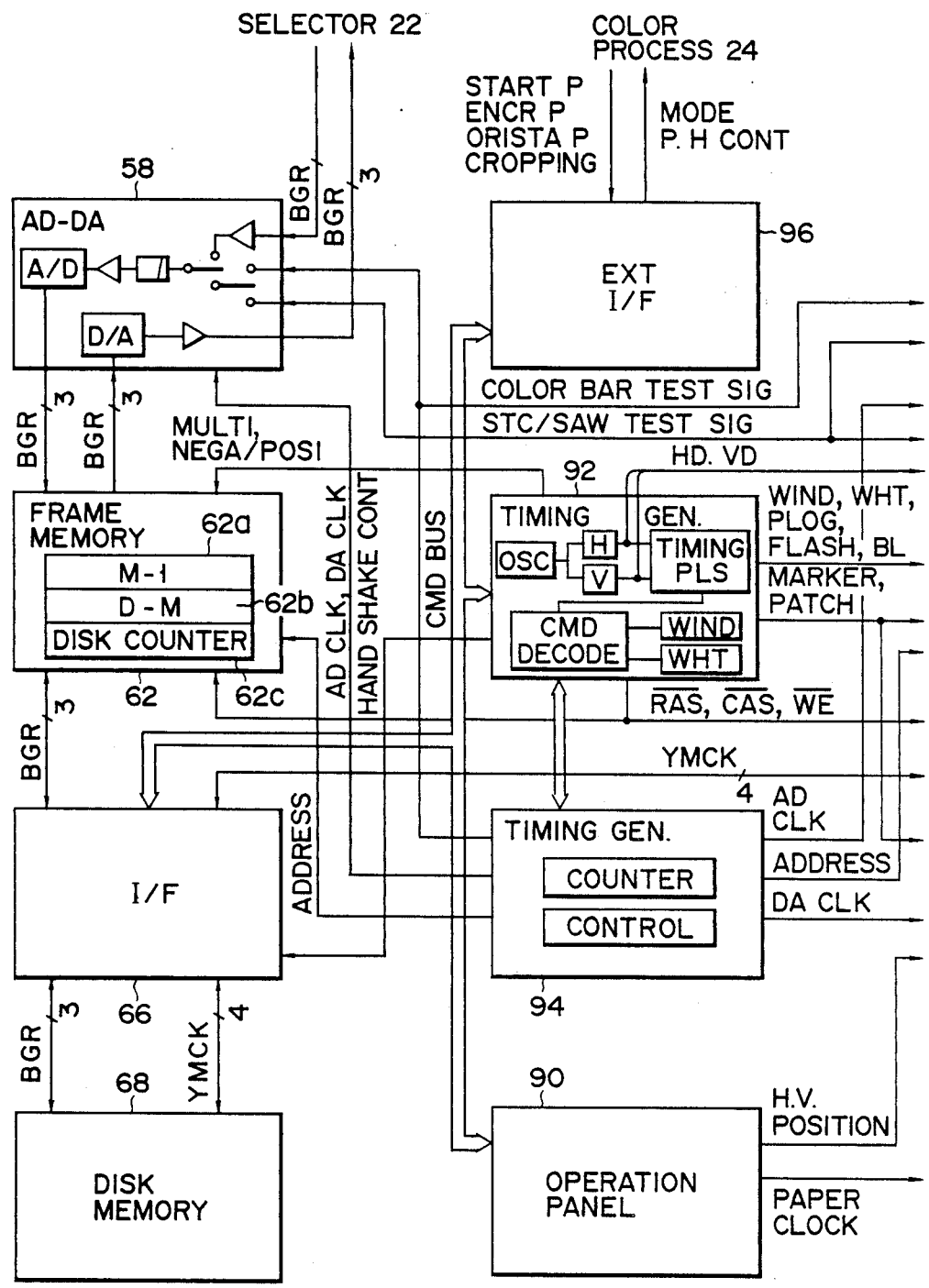
FIGS. 2A and 2B are block diagrams of a print simulation unit.

An embodiment of a print simulation apparatus according to the present invention will be described with reference to the accompanying drawings. FIG. 1 is a block diagram showing an overall arrangement.

In the basic arrangement of this embodiment, a color scanner is connected to print simulation unit 26. An existing direct scanner (SG608, available from DAINIPPON SCREEN MFG. CO., LTD.) can be used as the color scanner. Print simulation unit 26 is combined with color monitor 86 and arranged in a location where it is easy to see. Operation panel 90 is arranged near the operation panel of the color scanner.

The arrangement of the color scanner will be briefly described. Color original 12 attached to pickup drum 10 is scanned upon rotation of pickup drum 10 and movement of pickup head 14 in the axial direction of drum 10, thus picking up image information. Pickup head 14 comprises a photomultiplier as a photoelectric transducer, and outputs B, G, and R image signals of the obtained image signal using a beam splitter and blue (B), green (G), and red (R) filters.

The B, G, and R image signals output from pickup head 14 are current/voltage converted by current/voltage (C/V) converter 16. The obtained signals are supplied to calibration circuit 18 to be level-adjusted. The output signals from calibration circuit 18 are logarithmically compressed by logarithmic (LOG) amplifier 20, and are supplied to color process circuit 24.

Selector 22 is connected between LOG amplifier 20 and color process circuit 24. The first input terminal of selector 22 is connected to the output terminal of LOG amplifier 20, and the second input terminal thereof is connected to the output terminal of print simulation unit 26 which receives the output from LOG amplifier 20. Selector 22 selects one of the first and second input signals, and supplies the selected signal to color process circuit 24 from the output terminal.

Color process circuit 24 performs color correction or compensation, i.e., sets color separation conditions, and comprises a masking circuit, an under-color removal (UCR) circuit, a gradation correction circuit, a dot% display circuit, and the like.

The masking circuit performs a so-called masking correction, and converts the B, G, and R signals into yellow (Y), magenta (M), and cyan (C) signals. The UCR circuit converts the Y, M, and C signals into Y, M, C, and black (K) signals so as to print in four fundamental colors of print, i.e., Y, M, C, and K. The gradation correction circuit performs gradation correction such as highlight setting, shadow setting, middle separation, highlight separation, shadow separation, and the like. The operation member (dials, knobs, and the like) is operated to appropriately adjust these compensation and correction amounts, so that the obtained color separation plate has preferable color tone.

After color compensation and correction are performed in color process circuit 24, the Y, M, C, and K image signals are logarithmically expanded by inverse-logarithmic (LOG$^{-1}$) amplifier 28. Thereafter, the expanded signals are supplied to channel selector 30. The outputs from color process circuit 24 are also supplied to print simulation unit 26.

Channel selector 30 performs selection of the color signals depending on whether four color separation films are simultaneously exposed or the films are exposed color by color. The outputs from channel selector 30 are converted into digital signals by analog/digital (A/D) converter 32, and the digital signals are then supplied to dot generator 34.

Dot generator 34 converts the image signals into dot signals for recording the image signals as dots in accordance with appropriate magnification of color separation film 40 with respect to color original 12. Exposure head 36 exposes color separation film 40 on recording drum 38 in accordance with the magnification-controlled dot signals. Color separation film 40 is developed to form a color separation plate.

Note that the connecting portion between the color scanner and print simulation unit 26 is not limited to the above embodiment. More specifically, in the above description, since the output signals from LOG amplifier 20 (input signals to color process circuit 24) are supplied to print simulation unit 26, the signals from print simulation unit 26 are input to color process circuit 24. However, selector 22 may be connected between calibration circuit 18 and LOG amplifier 20, and the output signals from LOG$^{-1}$ amplifier 28 may be supplied to print simulation unit 26.

Figure 2B:
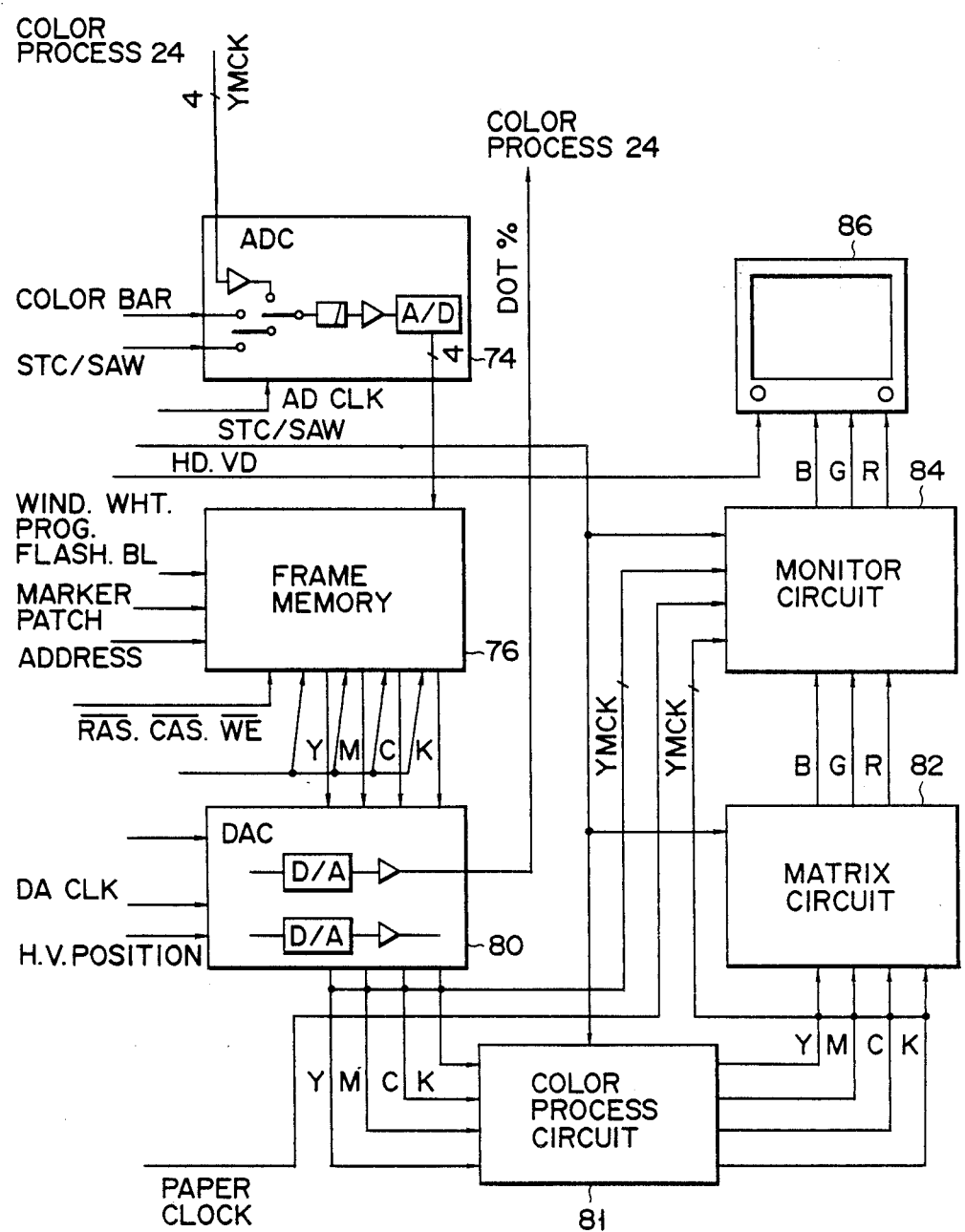

Print simulation unit 26 will be described in detail with reference to FIGS. 2A and 2B.

The B, G, and R signals output from LOG amplifier 20 and input to the first input terminal of selector 22 are written into first frame memory 62 (preferably comprising a semiconductor memory) through AD-DA converter (in this case, AD converter) 58 (preferably comprising a level adjuster, an averaging circuit, AD converter, DA converter, and the like).

The level adjuster converts voltage levels of the image signals. Since the voltage levels of the image signals in the color scanner are varied depending on the types of scanner, and since print simulation unit 26 has a normal voltage level of 0.7 Vpp as a video signal, level conversion is necessary. The averaging circuit is a kind of low-pass filter circuit, and averages the input image signals to an extent and controls them in correspondence with a sampling frequency in A/D conversion. The averaging circuit is described in detail in U.S. Pat. application No. 044,205 (filed on Apr. 30, 1987, patented on Sept. 6, 1988, U.S. Pat. No. 4,769,696), and a detailed description thereof will be omitted.

The analog input terminal of AD-DA converter 58 receives an STC/SAW test signal from first timing generator 92, and a color bar test signal from second timing generator 94. AD and DA clocks are supplied from second timing generator 94.

Frame memory 62 comprises frame memory (M-1) 62a, frame memory (D-M) 62b, and disk counter 62c. Each of frame memories 62a and 62b stores 512×512 (pixels)×3 (colors) for each frame in units of 8 bits per pixel (256 density levels). Frame memory 62 receives $\overline{RAS}$, $\overline{CAS}$, and $\overline{WE}$ signals from first timing generator 92, and receives an address signal from second timing generator 94.

Frame memory 62a can rotate an image through 90° clockwise or counterclockwise by replacing the $\overline{RAS}$ and $\overline{CAS}$ signals to replace horizontal and vertical read addresses.

Frame memory 62b is used for storing the image into hard disk memory 68 and has a negative/positive conversion function which is operated in response to a negative/positive control signal from first timing generator 92. Negative/positive conversion is performed when color original 12 is a negative original. The image signal is converted when it is sampled to 1/16 and supplied to I/F circuit 66.

The outputs from frame memory 62a are supplied to the second input terminal of selector 22 of the color scanner through AD-DA converter 58 and I/F circuit 56 and are then supplied to color process circuit 24 to be color-corrected.

The color scanner requires about 20 sec. to pick up an image during 512 rotations of pickup drum 10, and a frequency band of color process circuit 24 is designed to be about 20 kHz. For this reason, it takes about 20 sec. to input the image signals to frame memory 62, and it takes about 2 sec. to read out image signals for one frame from frame memory 62 in correspondence with the frequency band of color process circuit 24.

The outputs from frame memory 62b are also supplied to hard-disk memory 68 through I/F circuit 66, which includes a sampling circuit and the like. Hard-disk memory 68 preferably of the cassette type, and has a storage capacity of about 20 MB corresponding to image signals for 18 frames One of the 18 frames corresponds to an index image in which images of 16 frames are reduced (sampled) to 1/16 and aligned. Therefore, when the signal output from frame memory 62a is used for simulating, the signal output from frame memory 62b is stored into hard-disk memory 68.

Meanwhile, the Y, M, C, and K signals (color-corrected signals) output from color process circuit 24 and input to print simulation unit 26 are written in second frame memory 76, comprising a semiconductor memory, through A/D converter 74. A/D converter 74 also includes a level adjuster and an averaging circuit. The averaging circuit becomes effective when selector 22 is connected to amplifier 20.

The input terminal of A/D converter 74 receives the STC/SAW test signal from first timing generator 92, and the color bar test signal from second timing generator 94. The AD clocks are supplied from second timing generator 94.

Frame memory 76 stores 512×512 (pixels)×4 (colors) for one frame in units of 8 bits per pixel (256 density levels), and has a storage capacity for two frames. Frame memory 76 receives WIND, WHT, PROG, FLASH, BL, MARKER, PATCH, $\overline{RAS}$, $\overline{CAS}$, and $\overline{WE}$ signals from first timing generator 92. Frame memory 76 is connected to hard-disk memory 68 through I/F circuit 66, and can transmit and receive the Y, M, C, and K signals to and from hard-disk memory 68.

Frame memory 76 has a pixel enlargement function (×2, ×4), a reversing function (vertical and horizontal directions), a two-image comparison display function, white frame function and a non-interlace output function. According to the enlargement function, an area display and area shift of an enlarged portion are possible. In addition, an enlarged display area can be shifted. The reversing function is a function of mirror-reversing an image in vertical and horizontal directions. According to the white frame function, a pure white (paper white) frame outside a simulated print is displayed on color monitor 86.

The two-image comparison display function is a function of displaying halves of two images on right and left portions or upper and lower portions in one frame, and is used for comparing two images so that an image before being subjected to color correction is compared with a color-corrected image so that colors of specific portions (e.g., a background) of two images are matched.

Figure 3:
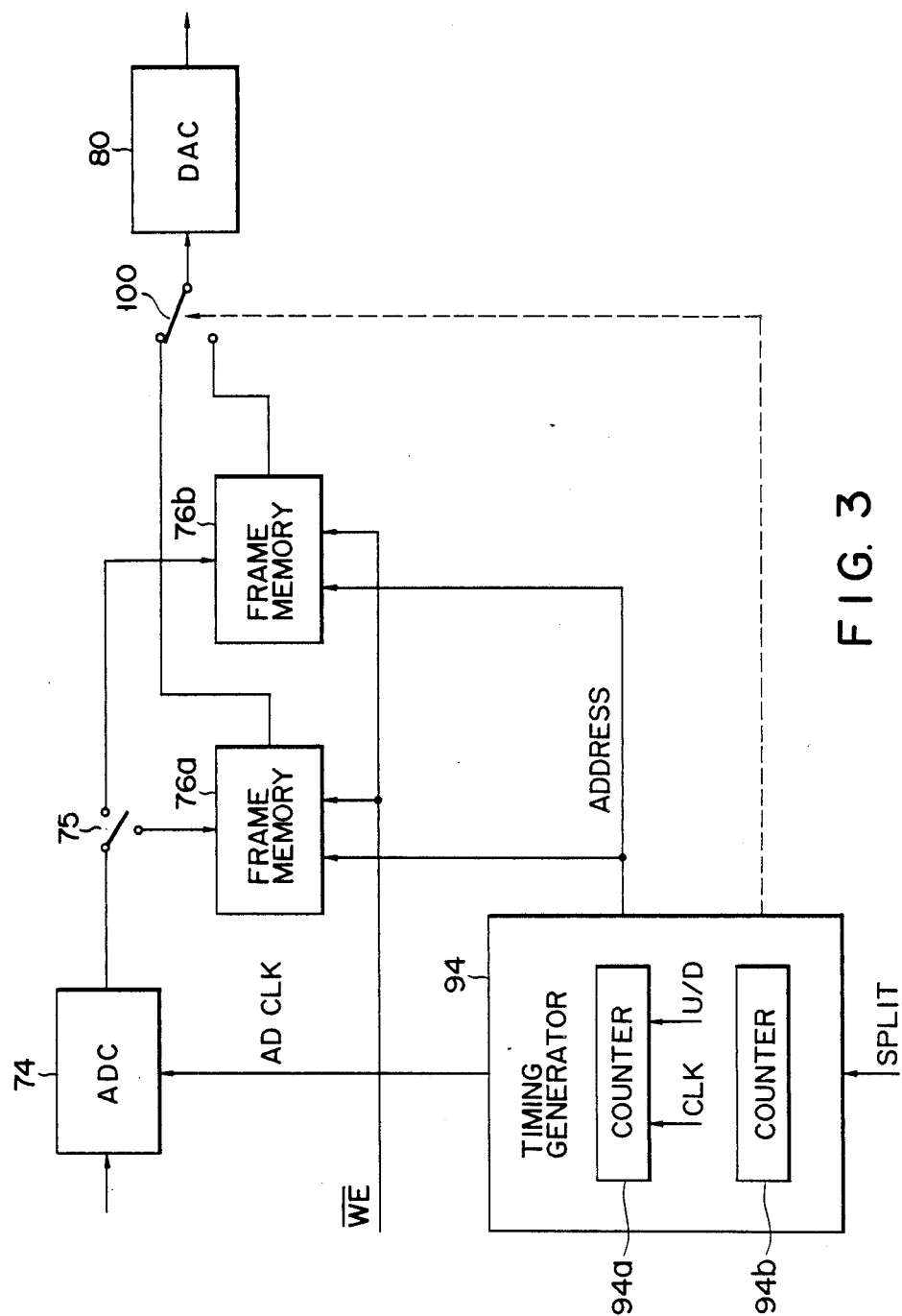
FIG. 3 is a block diagram of a two-image comparison/display circuit.

FIG. 3 shows an example of a two-image comparison display circuit. The digital image signal output from A/D converter 74 is stored in one of frame memories 76a and 76b in accordance with a selection of selector 75.

The signals read out from frame memories 76a and 76b are supplied to D/A converter 80 through selector 100, and are then supplied to color monitor 86 through color process circuit 81, matrix circuit 82, and monitor circuit 84. Selector 100 is controlled by a signal from second timing generator 94, and is normally switched to the frame memory 76a or 76b side. When instruction signal SPLIT is input to timing generator 94, selector 100 is switched at an intermediate timing of each horizontal scanning period. Thus, the signals read out from memories 76a and 76b are displayed on the right and left halves of the screen of monitor 86.

When instruction signal SPLIT is input, timing generator 94 controls read addresses of memories 76a and 76b, and supplies read addresses to only the memory connected to selector 100. Thus, the images corresponding to left halves of memories 76a and 76b are respectively displayed on the left and right halves of the screen of monitor 86. The read addresses can be scrolled so that the image portions in memories 76a and 76b displayed on the right and left portions of the screen are changed. The read addresses may be further controlled, so that right and left halves of the images in memories 76a and 76b are displayed.

In the above description, two images are displayed on right and left portions of the screen. However, selector 100 can be switched not at an intermediate timing of each horizontal scanning line but an intermediate timing during scanning of one frame, so that two images can be displayed on upper and lower portions of the screen.

According to the two-image comparison display circuit, two images can be compared on the screen of monitor 86, so that two images which were successively picked up from the color scanner or an image in hard-disk memory 68 can be compared with a color-corrected image picked up from the color scanner. As a result, the overall color tone, gradation, and the like can be easily compared and matched. The read addresses are controlled so that the two-image comparison display screen is scrolled to show the entire images.

Referring back to FIGS. 2A and 2B, D/A converter 80 has a flashing circuit, a dot% display circuit, a separated color display circuit, a white clip circuit, and a color trace circuit.

The flashing circuit causes pixel, having levels higher than a highlight set level; of the Y, M, C, and K images to flash The highlight set level can be varied for each color. When each of Y, M, and C images has a pixel with a level higher than the highlight set level, the pixel is flashed with a level of 100 dot %. When two of Y, M, and C images have a pixel with a level higher than the highlight set level, the pixel is flashed with 100 dot % level of the two images. When all of Y, M, and C images have a pixel with a level higher than the highlight set level, the pixel is flashed with a gray level (about 40 dot % of each of Y, M, and C images). When a pixel level of K images exceeds the highlight set level, the pixel is flashed with 40 dot % of K images. When the pixel level of all Y, M, C, and K images exceeds the highlight set level, the pixel is flashed with a 100 dot % level of K image. It is possible to select the color (Y, M, C, and K) of flashing display.

Figure 4:
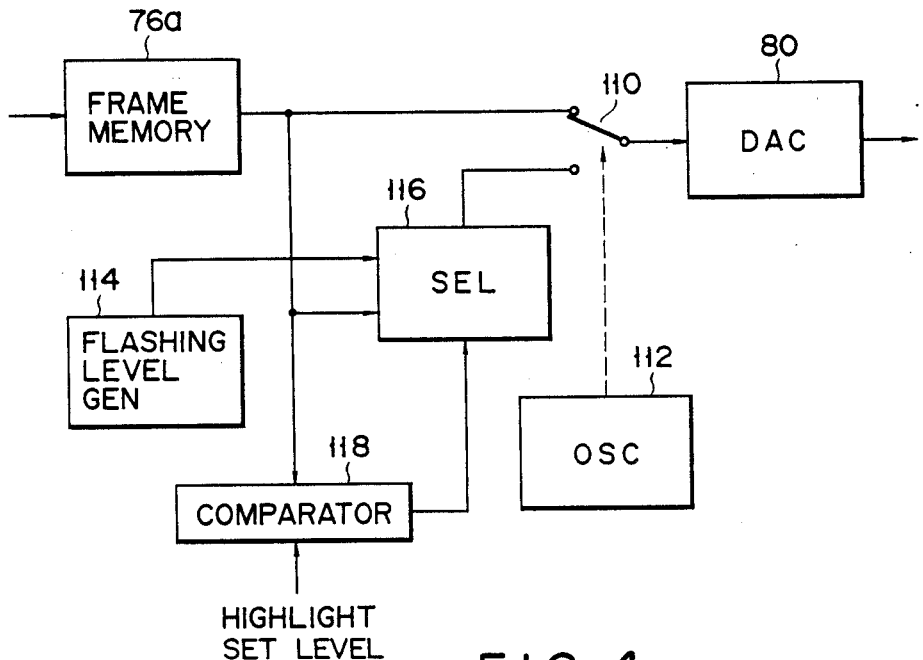
FIG. 4 is a block diagram of a flashing circuit.

FIG. 4 shows an example of the flashing circuit. The image signals read out from frame memory 76a are supplied to the first terminal of selector 110. The second terminal of selector 110 receives the outputs from selector 116. Selector 110 is controlled by an output from oscillator 112 which generates a signal of a predetermined frequency (corresponding to several frame periods). Normally, oscillator 112 is kept off, and selector 110 is connected to the first terminal side (frame memory 76a). When flashing display is instructed, oscillator 112 starts oscillation, and selector 110 is alternately switched between the first and second terminals, so that the outputs from frame memory 76a and selector 116 are alternately output.

The image signals read out from frame memory 76a are supplied to the first input terminal of selector 116. The output terminal of flashing level generator 114 for setting brightness or color of flashing is connected to the second input terminal of selector 116. Flashing level generator 114 comprises a total of 32 switches (8 switches (8 bits) per color). Selector 116 is switched in response to an output from comparator 118 for comparing the outputs from frame memory 76a and the highlight set level (dot %). Highlight levels are also set by a total of 32 switches (8 switches (8 bits) per color).

When the dot % value of the image signal read out from frame memory 76 is higher than the dot % value set as the highlight level, comparator 118 connects selector 116 to flashing level generator 114; otherwise, comparator 118 connects it to frame memory 76a. When oscillator 112 is operated in response to a flashing instruction, a pixel having a dot % value higher than the highlight set level is switched between the output from frame memory 76a and the output from flashing level generator 114 at the period set by oscillator 112, so that the pixel flashes on the screen.

When the dot % value of the image signal is lower than the highlight set level, the outputs from frame memory 76a are displayed independently of switching of selector 110 since selector 116 also outputs the signals from frame memory 76a.

In a photomechanical process, highlight setting is normally performed to set white balance. In this case, the dot% values of respective color components of a highlight portion are respectively set to be Y=99%, M=99%, and C=97%, or Y=98%, M=98%, and C=96% (negative display). This setting mostly determines balance around a highlight level, and is an important key to determine print quality.

If a measured dot% value of the color scanner (digital indication) and a dot% value of the output separation film are similarly stable, there is no problem. However, these dot% values are not so stable in practice. Since the measured value is influenced by particles of a color original during measurement, it greatly changes depending on locations. Thus, a dot% value cannot always be displayed at an operator's will.

In this case, if the operator intended to set Y=99%, M=99%, and C=97% but the actually measured dot% values are Y=99%, M=100%, and C=97%, a portion having these values is unbalanced. In this case, since the highlight set portion of a magenta image is flashed, the operator knows that a highlight of magenta must be reset.

Figure 5:
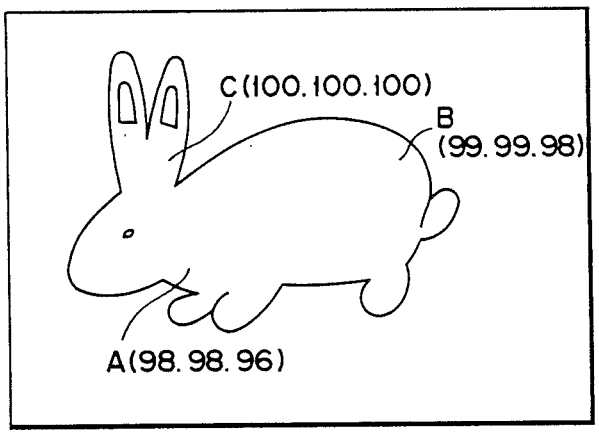
FIG. 5 is an illustration of an original for explaining an operation of the flashing circuit.

Flashing display is also effective for the following case. First, flashing display is effective for a case wherein not a highlight setting value but a highlight setting position is wrong. For example, assume that a color original shown in FIG. 5 is to be color-separated. The operator watches a white rabbit, and searches for a brightest spot where tone must be reproduced. Assume that the operator sets point A as a highlight set point. More specifically, the operator determines for this rabbit that a point where tone must be reproduced is A. After color separation, a film is developed and the color separation plate is checked. As a result, at point B, Y=99%, M=99%, and C=98%, and point C includes no dots and is white as paper color since Y=100%, M=100%, and C=100%. In this case, the operator selected the wrong highlight point, that is, point B is brighter than point A and point C is brighter than point B.

If such erroneous setting is made, the three-dimensional sense of the rabbit as a whole is impaired, and at point C, the tone of white wool is lost, resulting in a flat pattern. In this case, if points B and C are flashed, the setting error can be removed in advance.

Second, flashing display is effective for a case wherein a degree of muddiness of opposite colors is checked. More specifically, it can be detected if magenta in green, cyan in red, yellow in blue, or the like is omitted (exceed 100%).

In general, for pure colors, in order to emphasize gradation and texture of pure colors in contrast to their opposite colors, a corresponding opposite color is used. If not used, the pure color becomes too clear, and its three-dimensional sense is lost. Thus, it is not preferable for the process. In this case, if magenta in green, cyan in red, or yellow in blue is flashed, such a problem can be eliminated.

In this manner, if a flashing level is determined for each of Y, M, C, and K, a position having a dot% value exceeding the flashing level can be detected. Since flashing is performed in units of colors, i.e., Y, M, C, and K, it can be detected which color exceeds the flashing level. For a K plate, since the pixel level does not fall in the range of middle tone to highlight, a color selection switch is arranged and is switched as needed. Display is made at 40% level so that YMC, YMCK, and only K can be distinguished.

Referring back to FIGS. 2A and 2B, the dot% display circuit in D/A converter 80 displays a movable "+" mark on the screen of color monitor 86, and DC levels of Y, M, C, and K measured at its center are output. The separated color display circuit displays various combinations of pixels of Y, M, C, and K.

The color trace circuit in D/A converter 80 stores specific pixel colors (signal levels of four colors) of a predetermined original, and displays the stored colors together with a simulated image of a subsequent original, as needed. Thus, identical portions of a series of color originals can be reliably printed in the same color. When a color photograph is used in an original, colors of the original itself may often be misregistered. With this function, this can be corrected. In this case, this function is used for color matching among a plurality of originals such as matching of a background color of commodities or of a color of commodities (automobiles, home electric appliances, furnitures, and the like), and the like.

Assume that there are ten color originals, and they must have the same background color. A first original is finished to have proper tone. A signal for one pixel in the background is latched. When the next original is simulated, the latched pixel data is displayed as a color patch at the arbitrary portion in the simulated print image. The color correction knob of color process circuit 24 of the color scanner is operated, so that color tone of the background coincides with that of this color patch. Thus, the background color of a plurality of color originals can be matched.

Figure 6:
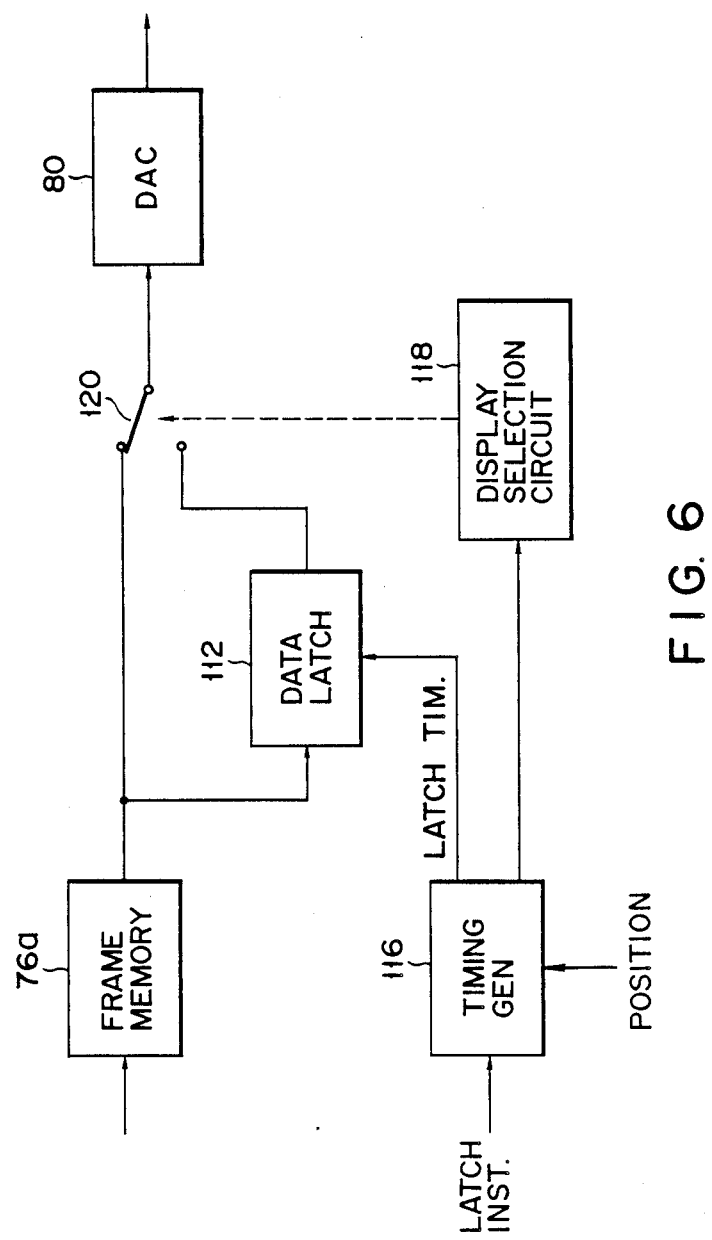
FIG. 6 is a block diagram of a color trace circuit.

FIG. 6 shows an example of the color trace circuit. The image signal read out from frame memory 76a is supplied to the first input terminal of selector 120, and is also supplied to data latch 112. The output from data latch 112 is supplied to the second input terminal of selector 120. A latch signal generated by timing signal generator 116 is supplied to data latch 112. In accordance with the signal from timing signal generator 116, a display switching signal generated by display selection circuit 118 is supplied to signal selector 120. In response to the display switching signal, signal selector 120 switches the output from frame memory 76a to the output from data latch 112. The output from signal selector 120 is supplied to D/A converter 80.

When color trace is performed, signal selector 120 is connected to the output of frame memory 76a during simulation of a first one of a series of color originals, and a print simulated image is displayed on color monitor 86. One pixel on the screen is designated by a pointer cursor. Timing signal generator 116 generates a latch signal in synchronism with the read timing of the image signal of the designated pixel from frame memory 76a. Thus, the pixel signal is stored in data latch 112 as reference color tone. The latched 1-pixel signal is held until new data is latched.

When second and subsequent originals are simulated, display control signal generator 118 generates a display switching signal to switch signal selector 120 when a simulated image near the pixel (color patch) latched is read out from frame memory 76a based on the timing signal. Thus, the signal latched in data latch 112 is displayed on color monitor 86 in place of the simulated image from frame memory 76a. Thus, comparison with a predetermined pixel of a previous original can be facilitated.

The display switching signal is a signal for determining a size of an area (color patch) to which the latched pixel is developed, i.e., the size of the color patch in order to allow easy observation of the latched 1-pixel signal. More specifically, the output from data latch 112 is supplied to color monitor 86 only during a period for which signal selector 120 is switched to data latch 112. Display control signal generator 118 comprises an AND gate, and generates the display switching signal (for switching signal selector 120 to the data latch 112 side) when a timing signal for determining a read address of a signal from frame memory 76a represents an address in the color patch. The size of the color patch can be changed as desired, and is 2×2 (cm) in this embodiment.

Although not shown, a dot% value of a latched pixel signal in units of colors and a dot% value of a simulated image in units of colors are displayed, and color tone can be matched using the dot% values.

Referring back to FIGS. 2A and 2B, color process circuit 81 includes a gamma compensation circuit for independently adjusting Y, M, C, and K to correct gamma characteristics of process and print. Four types of presetting are available. Matrix circuit 82 is a circuit for converting Y, M, C, and K image signals for a printing system into B, G, and R image signals for a television system to control a hue of ink, and for converting ink amounts into luminances of B, G, and R color beams.

The outputs from matrix circuit 82 are supplied to monitor circuit 84. Monitor circuit 84 performs curve correction (correction of nonlinearity caused in the color monitor), peaking correction, and dark level adjustment.

The B, G, and R image signals output from monitor circuit 84 are input to color monitor 86, and a printed image is simulated. In this embodiment, color monitor 86 illustratively employs a 20 inch non-interlace type monitor. Color monitor 86 preferably has good white uniformity.

Print simulation unit 26 further has operation panel 90 for supplying various operation instructions, and timing generators 92 and 94 for providing various operation timings.

Operation items of operation panel 90 are illustratively as follows: scan mode; film size (35 mm, 6×7 cm, 4×5 inch, 8×10 inch); channel selection (4ch); rotation/reversing; color separation display (Y, M, C, K); dot% display (joystick, on/off); enlargement (×2, ×4, position); white background (size, position, color); two-image comparison (switch, scroll volume); flashing (level setting and flashing in units of colors); image recording (frame memory 62→hard-disk memory 68); image recording (frame memory 76→hard-disk memory 68); image reproduction (in the case of an RGB image, hard-disk memory 68→frame memory 62→color process circuit 24→frame memory 76; in the case of a YMCK image, hard-disk memory 68→frame memory 78); multi-screen display (16-image display in hard-disk memory 68); image selection (frame memory 76a or 76b); and reproduction selection (frame memory 76a or 76b).

The scan mode is an operation mode of pickup head 14, and preferably includes three modes, i.e., quick, normal, and stop modes. When a quick scan switch is OFF, the pickup mode is a normal mode. The normal scan mode is designated not upon simulation but when an actual color separation plate is exposed. In this case, image signals are also sampled and displayed on color monitor 86. When a stop switch is turned on during quick scan, the color scanner is stopped. However, if the stop switch is turned on during fine scan, the color scanner is not stopped.

Input/output signals of timing generators 92 and 94 are illustratively as follows. Input signals: color separation start signal, encoder pulse, start, clopping, drum size, magnification, screen line count, dark, original size, rotation, reversing, and enlargement. Output signals: mode signal, transverse feed signal, sync signal, frame memory (62) control signal, frame memory (76) control signal, frame memory (78) control signal, and hard-disk control signal.

A simulation method in the print simulation apparatus according to this embodiment will be described below. The operator watches color original 12, and sets preferable color separation conditions in the masking circuit, UCR circuit, gradation correction circuit, and the like in color process circuit 24. The operator attaches color original 12 to pickup drum 10, and quick scan for simulating a printed image is performed. For example, if original 12 is a 4×5 inch film, the feed pitch of the pickup head of the color scanner is controlled and the entire frame of color original 12 is roughly scanned by 512 scanning lines, thus picking up image signals of color original 12. The image signals are input to print simulation unit 26, and are stored in frame memory 62. In this case, selector 22 is connected to print simulation unit 26. The image signal read out from frame memory 62 is supplied to color process circuit 24 and the color-corrected image signals are input to print simulation unit 26 and then stored in frame memory 76. A printed image is simulated based on the outputs from frame memory 76, and is displayed on color monitor 86.

If an image displayed on color monitor 86 has preferable color tone, color separation film 40 is attached to exposure drum 38, selector 22 is connected to LOG amplifier 20 (normal mode), and color original 12 is scanned to perform a color separation operation (film exposure).

If the color tone of the image displayed on color monitor 86 is not preferable, correction amounts of color process circuit 24 are adjusted to change color separation conditions. The image signal read out from frame memory 62 is corrected by color process circuit 42 and is stored into frame memory 76, thus changing color tone of the image displayed on color monitor 86.

In this manner, since color tone of a printed image under various color separation conditions can be checked on color monitor 86 without forming a color separation plate, color separation conditions can be essentially checked and set without performing an actual color separation operation.

As described above, according to the present invention, an original image is picked up by a color scanner, and image signals before being subjected to color correction are temporarily stored in a first frame memory. The signals read out from the first frame memory are written in a second frame memory. Correction amounts of the color correction circuit of the color scanner are adjusted while simulating a printed image on the screen of the color monitor based on the signals read out from the second frame memory. Thus, color separation conditions can be precisely determined and can be set in the color correction circuit by a simple operation.

Portions of two simulated images may be combined to generate image signals for one frame, and the image signals displayed, so that two simulated images can be compared. Thus, the overall color tone and gradation of two images can be matched.

When a print simulated image is displayed on the monitor, a predetermined area is displayed to have color tone not of a simulated image but color tone of another image as a reference, so that areas of a plurality of color originals which should have identical color tone can be precisely matched.

In a simulated image, a pixel having a dot% value exceeding a highlight set level is flashed. Therefore, it can be checked if highlight setting is correctly performed.

What is claimed is:

1. A print simulation apparatus connected to a color scanner having pickup means for obtaining image signals of a color original, color separation means for color-separating the image signals obtained by said pickup means into color component signals, color process means for adjusting the color separation conditions of the color component signals separated by the color separation means, and means for forming a color separation plate based on the adjusted color component signals, said apparatus comprising:
   first memory means for receiving and storing the image signals output from said pickup means;
   means for reading out the image signals from said first memory means and for supplying the read-out image signals to said color separation means;
   second memory means for storing the image signals output from said color separation means; and
   display means for displaying the image signals stored in said second memory means.

2. An apparatus according to claim 1, wherein the image signals are written into said first memory means at a speed corresponding to an operation speed of said pickup means, the image signals are written into said second memory means at a speed corresponding to an operation speed of said color separation means, and the image signals are read out said second memory means at a speed corresponding to an operation speed of said display means.

3. An apparatus to claim 1, wherein said first memory means stores B, G, and R color signals, and said second memory means stores Y, M, C and K color signals.

4. An apparatus according to claim 1, further comprising:
- data latch means for latching a signal of a predetermined pixel of the image signals output from said color separation means; and
- means for synthesizing the signal read out from said data latch means in the image signals output from said color separation means at a position corresponding to the predetermined pixel.

5. An apparatus according to claim 1, wherein said second memory means comprises:
- a frame memory for storing image signals for two frames; and
- synthesizing means for combining portions of image signals for the two frames read out from said frame memory so as to generate image signals for one frame.

6. An apparatus according to claim 5 wherein said synthesizing means comprises:
- means for displaying the corresponding halves of the image signals for the two frames read out from said frame memory on respective half portions of the screen; and
- means for scrolling the image signals displayed on the respective half portions of the screen.

7. An apparatus according to claim 1, further comprising:
- comparison means for determining whether or not a level of each pixel of the image signals output from said color correction means is higher than a predetermined highlight set level; and
- means for causing a display of the pixel having a level higher than the highlight set level to flash in accordance with the output from said comparison means.

* * * * *